(12) United States Patent
Hsieh et al.

(10) Patent No.: US 8,481,649 B2
(45) Date of Patent: Jul. 9, 2013

(54) COUPLED POLYMERS AND MANUFACTURING METHOD THEREOF

(75) Inventors: Chi-Chen Hsieh, Kaohsiung (TW); Chih-Kuang Tsai, Kaohsiung (KR); Yen-Hsian Li, Kaohsiung (TW); Ming-Cheng Chiu, Kaohsiung (TW)

(73) Assignee: TSRC Corporation, Taipei (TW)

( * ) Notice: Subject to any disclaimer, the term of this patent is extended or adjusted under 35 U.S.C. 154(b) by 371 days.

(21) Appl. No.: 12/754,887

(22) Filed: Apr. 6, 2010

(65) Prior Publication Data

US 2011/0009588 A1 Jan. 13, 2011

(30) Foreign Application Priority Data

Jul. 8, 2009 (TW) .............................. 98123136 A

(51) Int. Cl.
*C08C 19/25* (2006.01)
*C08C 19/28* (2006.01)

(52) U.S. Cl.
USPC ..... 525/332.9; 525/338; 525/342; 525/331.9; 525/339; 525/242

(58) Field of Classification Search
USPC ............................... 525/332.9, 338, 342, 242
See application file for complete search history.

(56) References Cited

U.S. PATENT DOCUMENTS

| 5,393,841 | A | 2/1995 | Himes et al. | |
| 5,508,333 | A * | 4/1996 | Shimizu | 524/424 |
| 7,220,798 | B2 | 5/2007 | Atwood et al. | |
| 2003/0232928 | A1 * | 12/2003 | Atwood et al. | 525/315 |

FOREIGN PATENT DOCUMENTS

| EP | 0661298 | 7/1995 |
| GB | 1014999 | 12/2005 |
| TW | I306101 | 2/2010 |

* cited by examiner

*Primary Examiner* — Roberto Rabago
(74) *Attorney, Agent, or Firm* — Volpe and Koenig, P.C.

(57) ABSTRACT

A coupled copolymer is provided. The coupled copolymer is coupled by reacting a silane coupling agent with a copolymer, where the copolymer is polymerized by a conjugated diene monomer and a vinyl aromatics monomer, and the silane coupling agent has an alkenyl group and a alkoxy group, and has a chemical Formula (I) as follows:

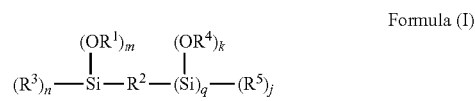

Formula (I)

where $R^1$ and $R^4$ are alkyl groups; $R^3$ is a group having an alkenyl group; $R^5$ is one of an alkyl and an alkenyl groups; q is one of "1" and "0"; when q=0, then k=j=0, $1 \leq n \leq 3$, $0 \leq m \leq 2$, m+n=3, and $R^2$ is alkoxy group; and when q=1, then k+j=3, $R^2$ is —$(CH_2)_r$-, r=1-6 and m+n=3.

18 Claims, 4 Drawing Sheets

COUPLED POLYMERS AND MANUFACTURING METHOD THEREOF

FIELD OF THE INVENTION

The present invention relates to a coupled copolymer and the manufacturing method thereof. The copolymer is synthesized by the monomers of the conjugated diene and the vinyl aromatics, and is coupled by using a novel coupling agent. More specifically, the present invention is related to the coupling of the copolymer and the hydrogenation of the coupled copolymer to produce the coupled polymers with high coupling efficiency and high content of four-arm coupling.

BACKGROUND OF THE INVENTION

The organo-alkali-metallic compounds are often used as initiators in the industries to synthesize the copolymers composed of vinyl aromatics and conjugated dienes. Then the coupling agent is used for coupling these polymers to form linear or star-shaped copolymers. By adopting this kind of coupling polymerization method, the thermoplastic elastomers, e.g. styrene-butadiene-styrene (SBS) copolymer, styrene-isoprene-styrene (SIS) copolymer, hydrogenated styrene-ethylene-butene-styrene (SEBS) copolymer, hydrogenated styrene-ethylene-propylene-styrene (SEPS) copolymer, etc. There are several advantages for the coupling polymerization method. For examples, the segment size of the styrene and the low viscosity can be well controlled during the polymerization. Compared with the sequential process, the coupling polymerization method has the excellent stability and high efficiency.

However, there are several problems for past used coupling agents. For instance, the coupling agents in UK patent No. 1014999 contain halogen, which will reduce the effect of the anti-oxidant, and the gains of the polymers by using this kind of coupling agents are not transparent enough. Furthermore, the byproduct, alkali metal halide, generated during the coupling reaction results in the corrosion of the pipes, and poisons the bacteria in the wasted water during the wasted water treatment. Moreover, this kind of coupling agents containing halogen has been listed as toxic compounds, and its use has been prohibited in several countries. Therefore, some substituted non-halogen coupling agents are gradually being developed, e.g. the coupling agent, $R_x$—Si—$(OR^1)_y$, in U.S. Pat. No. 7,220,798, and the alkoxy silane coupling agent, $Si(OR)_4$, in Taiwan patent application No. 200307698. However, the copolymers by using these coupling agents contain only 0-5 weight percent of four-arm copolymers. The products made by these polymers after the hydrogenation have low modulus and low tensile resistance due to the low content of the four-arm copolymers, and accordingly the industrial applications of these products are limited.

As the above mentioned, although there have been a lot of known coupling agents applicable to the copolymers composed of the monomers of vinyl aromatics and conjugated dienes, the silane coupling agents with the alkoxy and alkenyl functional groups in the present invention can solve the above mentioned problems. The coupled copolymers by using the silane coupling agent with the alkoxy and alkenyl functional groups disclosed in the present invention do not produce any halide byproduct, can reach the coupling efficiency of 60-95 weight percent, and contain the four-arm copolymers in a range of 10-30 weight percent. For the hydrogenated coupled copolymers, the ratio of the coupling efficiency after hydrogenation to that before the hydrogenation is higher than 0.7, and the ratio of the content of the four-arm copolymers after hydrogenation to that before hydrogenation is also higher than 0.7. It can be seen from the above that the coupled copolymers by using the silane coupling agent with the alkoxy and alkenyl functional groups disclosed in the present invention contain obviously much more four-arm copolymers than those by using the conventional alkoxy silane coupling agents no matter the hydrogenation reaction is introduced or not. The processed products made by the coupled copolymers of the present invention have higher mechanical modulus, can sustain higher strengths, and have wider applications in the industries. The silane coupling agents with the alkoxy and alkenyl functional groups disclosed in the present invention have higher coupling efficiency. The coupled copolymers made by these silane coupling agents have excellent stability, still maintain high coupling efficiency and high content of four-arm copolymers after the hydrogenation, and therefore can provide excellent rubber mechanical properties. The present invention is described below.

SUMMARY OF THE INVENTION

The present invention provides a silane coupling agent with the alkoxy and alkenyl functional groups in order to produce the coupled copolymers.

In accordance with one aspect of the present invention, a coupled copolymer is provided. The coupled copolymer is coupled by reacting a silane coupling agent with a copolymer, wherein the copolymer is polymerized by a conjugated diene monomer and a vinyl aromatics monomer, and the silane coupling agent has an alkenyl group and a alkoxy group, and has a chemical Formula (I) as follows:

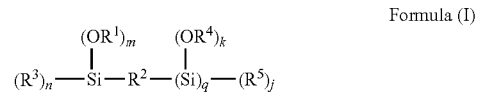

Formula (I)

where $R^1$ and $R^4$ are alkyl groups; $R^3$ is a group having an alkenyl group; $R^5$ is an alkyl group, an alkoxy group or an alkenyl group; q is one of "1" and "0"; when q=0, then k=j=0, $1 \leq n \leq 3$, $0 \leq m \leq 2$, m+n=3, and $R^2$ is alkoxy group; and when q=1, then k+j=3, $R^2$ is —$(CH_2)_r$—, r=1-6 and m+n=3.

In accordance with another aspect of the present invention, a method for manufacturing a coupled copolymer is provided. The method includes (a) polymerizing a copolymer by using a conjugated diene monomer and a vinyl aromatics monomer; (b) mixing a silane coupling agent, which has an alkenyl group and an alkoxy group, with the copolymer for undergoing a coupling reaction to form a coupled copolymer, wherein the silane coupling agent has a chemical Formula (I) as follows:

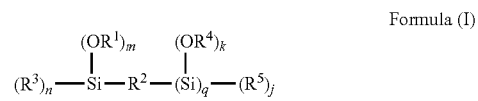

Formula (I)

where $R^1$ and $R^4$ are alkyl groups; $R^3$ is a group having an alkenyl group; $R^5$ is an alkyl group, an alkoxy group or an alkenyl group; q is one of "1" and "0"; when q=0, then k=j=0, $1 \leq n \leq 3$, $0 \leq m \leq 2$, m+n=3, and $R^2$ is alkoxy group; and when q=1, then k+j=3, $R^2$ is —$(CH_2)_r$—, r=1-6 and m+n=3.

Preferably, the coupled copolymer has a coupling efficiency in a range of 60-95 weight percent.

Preferably, the hydrogenation reaction has a hydrogenation rate larger than 90%.

In accordance with a further aspect of the present invention, a hydrogenated coupled copolymer is provided. The hydrogenated coupled copolymer is formed by reacting a copolymer, which is polymerized by using a conjugated diene monomer and a vinyl aromatics monomer, with a silane coupling agent having an alkenyl group and an alkoxy group, wherein the silane coupling agent has a chemical Formula (I) as follows:

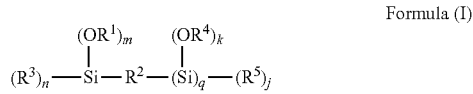

Formula (I)

where $R^1$ and $R^4$ are alkyl groups; $R^3$ is a group having an alkenyl group; $R^5$ is an alkyl group, an alkoxy group or an alkenyl group; q is one of "1" and "0"; when q=0, then k=j=0, $1 \leq n \leq 3$, $0 \leq m \leq 2$, m+n=3, and $R^2$ is alkoxy group; and when q=1, then k+j=3, $R^2$ is —$(CH_2)_r$—, r=1-6 and m+n=3.

Preferably, the vinyl aromatics comprises one selected from a group consisting of styrene, α-methyl styrene, p-ethyl styrene, cyclohexyl styrene, p-methyl styrene, o-methyl styrene, m-methyl styrene, 1-vinyl-5-hexyl naphthalene, vinyl naphthalene, and a combination thereof.

Preferably, the conjugated diene comprises one selected from a group consisting of 1,3-butadiene, 2,3-dimethyl-1,3-butadiene, 3-butyl-1,3-octadiene, isoprene, 1,3-piperlene, 2-phenyl-1,3-butadiene and a combination thereof.

Preferably, the hydrogenated coupled copolymer has a number average molecular weight in a range of 30,000 to 600,000.

Preferably, the hydrogenated coupled copolymer has a coupling efficiency in a range of 60-95 weight percent.

Preferably, the hydrogenated coupled copolymer comprises a four-arm coupled copolymer having a content in a range of 10-30 weight percent.

Preferably, a molar ratio of the coupled copolymer to the silane coupling agent is in a range of 1.4-6.67.

Preferably, the silane coupling agent comprises one selected from a group consisting of vinyl trimethoxy silane, vinyl triethoxy silane, vinyl tripropoxy silane, vinyl tributoxy silane, vinyl ethoxy dimethoxy silane, vinyl ethoxy dipropoxy silane, vinyl ethoxy dibutoxy silane, vinyl diethoxy methoxy silane, vinyl diethoxy propoxy silane, vinyl diethoxy butoxy silane, propenyl trimethoxy silane, propenyl triethoxy silane, propenyl tripropoxy silane, propenyl tributoxy silane, propenyl ethoxy dimethoxy silane, propenyl ethoxy dipropoxy silane, propenyl ethoxy dibutoxy silane, propenyl diethoxy methoxy silane, propenyl diethoxy propoxy silane, propenyl diethoxy butoxy silane, butenyl trimethoxy silane, butenyl triethoxy silane, butenyl tripropoxy silane, butenyl tributoxy silane, butenyl ethoxy dimethoxy silane, butenyl ethoxy dipropoxy silane, butenyl ethoxy dibutoxy silane, butenyl diethoxy methoxy silane, butenyl diethoxy propoxy silane, butenyl diethoxy butoxy silane, pentenyl trimethoxy silane, pentenyl triethoxy silane, pentenyl tripropoxy silane, pentenyl tributoxy silane, pentenyl ethoxy dimethoxy silane, pentenyl ethoxy dipropoxy silane, pentenyl ethoxy dibutoxy silane, pentenyl diethoxy methoxy silane, pentenyl diethoxy propoxy silane, pentenyl diethoxy butoxy silane, hexenyl trimethoxy silane, hexenyl triethoxy silane, hexenyl tripropoxy silane, hexenyl tributoxy silane, hexenyl ethoxy dimethoxy silane, hexenyl ethoxy dipropoxy silane, hexenyl ethoxy dibutoxy silane, hexenyl dimethoxy methoxy silane, hexenyl dimethoxy propoxy silane, hexenyl dimethoxy butoxy silane, bis(vinyl dimethoxy silyl)methane, bis(vinyl dimethoxy silyl)ethane, bis(vinyl dimethoxy silyl)propane, bis(vinyl dimethoxy silyl)butane, bis(vinyl diethoxy silyl)methane, bis(vinyl diethoxy silyl)ethane, bis(vinyl diethoxy silyl)propane, bis(vinyl diethoxy silyl)butane, bis(vinyl dipropoxy silyl)methane, bis(vinyl dipropoxy silyl)ethane, bis(vinyl dipropoxy silyl) propane, bis(vinyl dipropoxy silyl)butane, bis(vinyl dibutoxy silyl)methane, bis(vinyl dibutoxy silyl)ethane, bis(vinyl dibutoxy silyl)propane, bis(vinyl dibutoxy silyl)butane, bis(propenyl dimethoxy silyl)methane, bis(propenyl dimethoxy silyl) ethane, bis(propenyl dimethoxy silyl)propane, bis(propenyl dimethoxy silyl)butane, bis(propenyl diethoxy silyl)methane, bis(propenyl diethoxy silyl)ethane, bis(propenyl diethoxy silyl)propane, bis(propenyl diethoxy silyl)butane, bis(propenyl dipropoxy silyl)methane, bis(propenyl dipropoxy silyl)ethane, bis(propenyl dipropoxy silyl)propane, bis(propenyl dipropoxy silyl)butane, bis(propenyl dibutoxy silyl)methane, bis(propenyl dibutoxy silyl)ethane, bis(propenyl dibutoxy silyl)propane, bis(propenyl dibutoxy silyl)butane, bis(butenyl dimethoxy silyl)methane, bis(butenyl dimethoxy silyl)ethane, bis(butenyl dimethoxy silyl)propane, bis(butenyl dimethoxy silyl)butane, bis(butenyl diethoxy silyl)methane, bis(butenyl diethoxy silyl)ethane, bis(butenyl diethoxy silyl)propane, bis(butenyl diethoxy silyl)butane, bis(butenyl dipropoxy silyl)methane, bis(butenyl dipropoxy silyl)ethane, bis(butenyl dipropoxy silyl)propane, bis(butenyl dipropoxy silyl)butane, bis(butenyl dibutoxy silyl)methane, bis(butenyl dibutoxy silyl)ethane, bis(butenyl dibutoxy silyl)propane, bis(butenyl dibutoxy silyl)butane, bis(pentenyl dimethoxy silyl)methane, bis(pentenyl dimethoxy silyl)ethane, bis(pentenyl dimethoxy silyl)propane, bis(pentenyl dimethoxy silyl)butane, bis(pentenyl diethoxy silyl)methane, bis(pentenyl diethoxy silyl)ethane, bis(pentenyl diethoxy silyl)propane, bis(pentenyl diethoxy silyl)butane, bis(pentenyl dipropoxy silyl)methane, bis(pentenyl dipropoxy silyl)ethane, bis(pentenyl dipropoxy silyl)propane, bis(pentenyl dipropoxy silyl)butane, bis(pentenyl dibutoxy silyl)methane, bis(pentenyl dibutoxy silyl)ethane, bis(pentenyl dibutoxy silyl)propane, bis(pentenyl dibutoxy silyl)butane, bis(hexenyl dimethoxy silyl)methane, bis(hexenyl dimethoxy silyl)ethane, bis(hexenyl dimethoxy silyl)propane, bis(hexenyl dimethoxy silyl)butane, bis(hexenyl diethoxy silyl)methane, bis(hexenyl diethoxy silyl)ethane, bis(hexenyl diethoxy silyl)propane, bis(hexenyl diethoxy silyl)butane, bis(hexenyl dipropoxy silyl)methane, bis(hexenyl dipropoxy silyl)ethane, bis(hexenyl dipropoxy silyl)propane, bis(hexenyl dipropoxy silyl)butane, bis(hexenyl dibutoxy silyl)methane, bis(hexenyl dibutoxy silyl)ethane, bis(hexenyl dibutoxy silyl)propane, bis(hexenyl dibutoxy silyl)butane and a derivative thereof.

Preferably, the hydrogenated coupled copolymer comprises a first part and a second part, wherein the first part is formed from the conjugated diene monomer and has a hydrogenation rate higher than 50%, and the second part is formed from the vinyl aromatics monomer and has a hydrogenation rate lower than 10%.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

Figure 1:
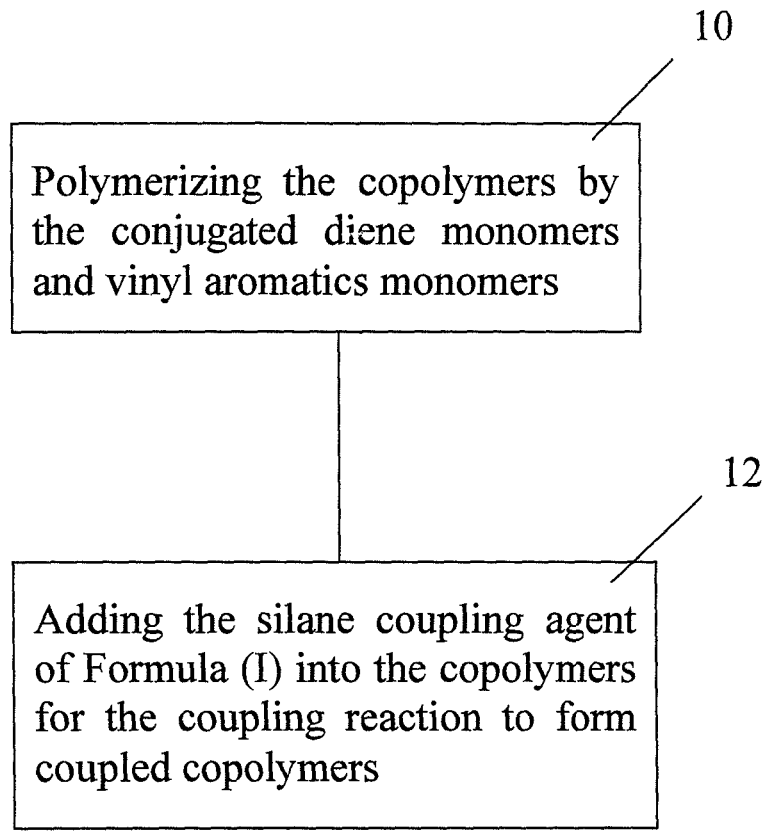
FIG. 1 is the schematic diagram showing the flowchart of the method for manufacturing the coupled copolymers according to one embodiment of the present invention.

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

In the present invention, the coupled copolymers are obtained by reacting the silane coupling agents, which contain the alkoxy and alkenyl functional groups, with the copolymers polymerized from the conjugated diene monomers and the vinyl aromatics monomers. The above-mentioned copolymers can optionally contain at least one vinyl aromatics segments A and at least one conjugated diene segments B. These coupled copolymers can have the coupling efficiency in the range of 60 to 95 weight percent, and can contain the four-arm copolymers in the range of 10 to 30 weight percent. The above mentioned silane coupling agents with the alkoxy and alkenyl functional groups have the chemical formula of Formula (I) shown below:

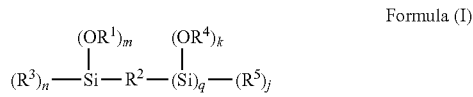

Formula (I)

where $R^1$ and $R^4$ are the same or different alkyl groups; $R^3$ is a group having an alkenyl group; $R^5$ is an alkyl group, an alkoxy group or an alkenyl group; q is one of "1" and "0"; when q=0, then k=j=0, $1 \leq n \leq 3$, $0 \leq m \leq 2$, m+n=3, and $R^2$ is alkoxy group; and when q=1, then k+j=3, $R^2$ is —$(CH_2)_r$—, r=1-6 and m+n=3.

In one embodiment of the present invention, $R^1$ and $R^4$ are the same or different $C_1$~$C_6$ alkyl groups; $R^3$ is a $C_2$~$C_6$ group containing an alkenyl group; $R^5$ is a $C_1$~$C_6$ alkyl or alkoxy group or a $C_2$~$C_6$ alkenyl group; when q=0, k=j=0, $1 \leq n \leq 3$, $0 \leq m \leq 2$, m+n=3, and $R^2$ is a $C_1$~$C_6$ alkoxy group; and when q=1, k+j=3, $R^2$ is —$(CH_2)_r$—, r=1-6 and m+n=3.

The vinyl aromatics used in the polymerization reaction in the present invention can include one selected from a group consisting of styrene, α-methyl styrene, p-ethyl styrene, cyclohexyl styrene, p-methyl styrene, o-methyl styrene, m-methyl styrene, 1-vinyl-5-hexyl naphthalene, vinyl naphthalene, and a combination thereof. The styrene is preferably chosen in the embodiments of the present invention.

The conjugated diene used in the polymerization reaction in the present invention can include one selected from a group consisting of 1,3-butadiene, 2,3-dimethyl-1,3-butadiene, 3-butyl-1,3-octadiene, isoprene, 1,3-piperlene, 2-phenyl-1,3-butadiene and a combination thereof. The 1,3-butadiene, isoprene and their mixture are chosen in the embodiments of the present invention.

The styrene is preferably selected as the vinyl aromatics monomer, and the butadiene and isoprene are preferably selected as the conjugated diene monomers in the embodiments of the present invention, where the segments of vinyl aromatics occupy 5 to 50 weight percent of the whole copolymers, preferably 10 to 45 weight percent.

The molecular chains of the above mentioned copolymers can contain the structures of A-B, A-B-B, B-A-B or A-B-A-B optionally, where B segments are connected with the coupling agents; or the structures of B-A, A-B-A, B-A-B-A, where A segments are connected with the coupling agents. In the above, A is the segments of vinyl aromatics, preferably the segments of styrene, and B is the segments with rubber characteristics, e.g. the segments of poly(conjugated diene), the segments of copolymers with the conjugated dienes, or the segments synthesized by the conjugated dienes and vinyl aromatics monomers. Such copolymers have the properties of elastomers and the thermoplastic polymers. Thus, these copolymers can be manufactured by using the standard production processes of the thermoplastic polymers, and the final products of these copolymers have the properties of the elastomers.

The control of the molecular weight of the copolymers polymerized by the conjugated diene monomers and vinyl aromatics monomers is important. The number average molecular weight of the vinyl aromatics segment A is in the range of 3,000~100,000; while the number average molecular weight of the conjugated diene segment B is in the range of 4,000~200,000. The number average molecular weight of the A-B copolymers polymerized by the vinyl aromatics monomers and the conjugated diene monomers is in the range of 7,000~300,000. The number average molecular weight of the coupled copolymers coupled by reacting the silane coupling agents, which contain the alkoxy and alkenyl functional groups, with the above mentioned copolymers is in the range of 30,000~600,000, preferably 70,000~500,000. After the further hydrogenation reaction, the hydrogenated coupled copolymers have the number average molecular weight in, the range of 30,000~600,000, preferably 70,000~500,000.

In the preferred embodiment of the present invention, the coupled copolymers can be manufactured by the following detailed explained reaction steps. These copolymers can be produced by applying the known conventional techniques, e.g. cationic polymerization, anionic polymerization, free radical polymerization, complex polymerization, solution polymerization, emulsion polymerization, etc. Basically, the processes are composed of two major steps. In the first step, the organic lithium compound is used for the polymerization reactions to form the copolymers with the lithium ends. In the second step, the copolymers with the lithium ends are reacted with the above defined coupling agents. The hydrogenation reaction may proceed to obtain the hydrogenated coupled copolymers when it is required.

In the first step of the present processes, the initiator, organic lithium, is used to initiate the reaction with the monomers. In the following polymerization reaction, the monomers are added for the polymerization to grow the molecular chains and to form the copolymers with the lithium end. The polymerization step can be a single step or a series of the continuous steps. The molecular chains of the polymers can include homopolymers, randomly distributed copolymers formed by two or more monomers, or block copolymers formed by several segments, where the monomers can be simultaneously synthesized with the initiator, organic lithium. When the molecular chains of the polymers are consisted of two or more homopolymers or copolymers, these individual molecular segments can be generated by serially adding monomers in a way of one segment after another segment, or by continuously adding monomers.

The available and preferred monomers in this embodiment are the same as those mentioned above in the previous embodiment, e.g. the conjugated diene and vinyl aromatics monomers.

The organic lithium initiators for producing the copolymers formed by the conjugated diene and vinyl aromatics monomers usually have the structure of R—Li, where R is a hydrocarbon group of $C_1$~$C_{12}$. The suitable organic lithium initiators for the present invention include n-propyl lithium, isopropyl lithium, n-butyl lithium, sec-butyl lithium, tert-butyl lithium, n-pentyl lithium, phenyl lithium, tolyl lithium, etc. The n-butyl lithium and sec-butyl lithium are preferred. The amount of the organic lithium for the polymerization depends on the desired molecular weight of the polymers. This amount is usually in the range of 0.005 to 5 weight percent based on the total weight of all used monomers.

The polymerization reaction can proceed under the existence of the solvent medium. The solvent used in the polymerization can be used in the subsequent hydrogenation reaction. The suitable solvents in the polymerization reaction can be inert organic solvents, which are not reacted during the polymerization and hydrogenation reactions. These solvents include aliphatic hydrocarbon compounds, e.g. n-pentane, isopentane, 2,2,4-trimethyl pentane, n-hexane, isohexane, n-heptane, isoheptane, n-octane and isooctane; naphthenes, e.g. cyclohexane, methyl cyclohexane, ethyl cyclohexane, cyclopentane, cycloheptane and methyl cyclopentane; or aromatic compounds, e.g. benzene, toluene, xylene, ethyl benzene, diethyl benzene and propyl benzene. The cyclohexane and n-hexane are preferred. In a normal condition, if only the inert solvent is used as the polymerization medium, the polymerization rates of the vinyl aromatics and the conjugated dienes are slow, and the difference between these two polymerization rates is quite much. These issues can be overcome by adding the polar solvents. The suitable polar solvents include various ethers, e.g. tetrahydrofuran, diethyl ether, cyclopentyl ether, dipropyl ether, glycol dimethyl ether, glycol diethyl ether, diethylene glycol, dimethyl ether and methyl ethyl ether. The tetrahydrofuran and diethyl ether are preferred.

The existence of the polar solvent generally can increase the content of the vinyl portion in the copolymers. The suitable range of vinyl content is about 5~85%. The amounts of the polar solvents can be adjusted based on their properties so that the vinyl content can fall into the above suitable range.

In the first step, the polymerization reaction usually takes about a few minutes to 8 hours. The ideal polymerization time is in the range of 20 minutes to four hours. The polymerization temperature is usually in the range of 0° C.~200° C., probably 50° C.~120° C.

After the polymerization reaction is finished, the coupling reaction proceeds in the second step, that is, to mix the lithium-ended copolymers and the coupling agent. This step must be done before adding the substances, which can terminate the polymerization reaction or remove the lithium. Therefore, the coupling agent and the copolymers polymerized by the conjugated diene monomer and the vinyl aromatics monomer must be mixed before the water, acid, alcohol or other substances for deactivating the copolymer are added.

The amount of the used coupling agent depends on the coupling efficiency and the properties of the coupled polymers. The ideal amount of the coupling agent is determined by the molar ratio of Li/Si in the range of 1.4~6.67, preferably 3.0~4.5, where the molar ratio of Li/Si is the molar ratio of Li-ended copolymers to the coupling agent, i.e. silane (Si) coupling agent. If too much coupling agent is used, i.e. Li/Si ratio smaller than 1.4, the coupling efficiency will be reduced, and so will the mechanical strength of the coupled copolymers. If less coupling agent is used, i.e. Li/Si ratio higher than 6.67, the coupling tends to the multiple-arm coupling, but the coupling efficiency will be reduced and the total amount of multiple-arm products will be insufficient. Thus, the molar ratio of Li/Si had better to be controlled in the range of 1.4~6.67.

The suitable coupling agents in the present invention are the silane coupling agents with the alkenyl and alkoxy groups as shown in the Formula (I). Some examples are listed in the followings, vinyl trimethoxy silane, vinyl triethoxy silane, vinyl tripropoxy silane, vinyl tributoxy silane, vinyl ethoxy dimethoxy silane, vinyl ethoxy dipropoxy silane, vinyl ethoxy dibutoxy silane, vinyl diethoxy methoxy silane, vinyl diethoxy propoxy silane, vinyl diethoxy butoxy silane, propenyl trimethoxy silane, propenyl triethoxy silane, propenyl tripropoxy silane, propenyl tributoxy silane, propenyl ethoxy dimethoxy silane, propenyl ethoxy dipropoxy silane, propenyl ethoxy dibutoxy silane, propenyl diethoxy methoxy silane, propenyl diethoxy propoxy silane, propenyl diethoxy butoxy silane, butenyl trimethoxy silane, butenyl triethoxy silane, butenyl tripropoxy silane, butenyl tributoxy silane, butenyl ethoxy dimethoxy silane, butenyl ethoxy dipropoxy silane, butenyl ethoxy dibutoxy silane, butenyl diethoxy methoxy silane, butenyl diethoxy propoxy silane, butenyl diethoxy butoxy silane, pentenyl trimethoxy silane, pentenyl triethoxy silane, pentenyl tripropoxy silane, pentenyl tributoxy silane, pentenyl ethoxy dimethoxy silane, pentenyl ethoxy dipropoxy silane, pentenyl ethoxy dibutoxy silane, pentenyl diethoxy methoxy silane, pentenyl diethoxy propoxy silane, pentenyl diethoxy butoxy silane, hexenyl trimethoxy silane, hexenyl triethoxy silane, hexenyl tripropoxy silane, hexenyl tributoxy silane, hexenyl ethoxy dimethoxy silane, hexenyl ethoxy dipropoxy silane, hexenyl ethoxy dibutoxy silane, hexenyl dimethoxy methoxy silane, hexenyl dimethoxy propoxy silane, hexenyl dimethoxy butoxy silane, bis(vinyl dimethoxy silyl)methane, bis(vinyl dimethoxy silyl)ethane, bis(vinyl dimethoxy silyl)propane, bis(vinyl dimethoxy silyl)butane, bis(vinyl diethoxy silyl)methane, bis (vinyl diethoxy silyl)ethane, bis(vinyl diethoxy silyl)propane, bis(vinyl diethoxy silyl)butane, bis(vinyl dipropoxy silyl)methane, bis(vinyl dipropoxy silyl)ethane, bis(vinyl dipropoxy silyl)propane, bis(vinyl dipropoxy silyl)butane, bis(vinyl dibutoxy silyl)methane, bis(vinyl dibutoxy silyl) ethane, bis(vinyl dibutoxy silyl)propane, bis(vinyl dibutoxy silyl)butane, bis(propenyl dimethoxy silyl)methane, bis(propenyl dimethoxy silyl)ethane, bis(propenyl dimethoxy silyl) propane, bis(propenyl dimethoxy silyl)butane, bis(propenyl diethoxy silyl)methane, bis(propenyl diethoxy silyl)ethane, bis(propenyl diethoxy silyl)propane, bis(propenyl diethoxy silyl)butane, bis(propenyl dipropoxy silyl)methane, bis(propenyl dipropoxy silyl)ethane, bis(propenyl dipropoxy silyl) propane, bis(propenyl dipropoxy silyl)butane, bis(propenyl dibutoxy silyl)methane, bis(propenyl dibutoxy silyl)ethane, bis(propenyl dibutoxy silyl)propane, bis(propenyl dibutoxy silyl)butane, bis(butenyl dimethoxy silyl)methane, bis(butenyl dimethoxy silyl)ethane, bis(butenyl dimethoxy silyl)propane, bis(butenyl dimethoxy silyl)butane, bis(butenyl diethoxy silyl)methane, bis(butenyl diethoxy silyl)ethane, bis (butenyl diethoxy silyl)propane, bis(butenyl diethoxy silyl) butane, bis(butenyl dipropoxy silyl)methane, bis(butenyl dipropoxy silyl)ethane, bis(butenyl dipropoxy silyl)propane, bis(butenyl dipropoxy silyl)butane, bis(butenyl dibutoxy silyl)methane, bis(butenyl dibutoxy silyl)ethane, bis(butenyl dibutoxy silyl)propane, bis(butenyl dibutoxy silyl)butane, bis (pentenyl dimethoxy silyl)methane, bis(pentenyl dimethoxy silyl)ethane, bis(pentenyl dimethoxy silyl)propane, bis(pentenyl dimethoxy silyl)butane, bis(pentenyl diethoxy silyl) methane, bis(pentenyl diethoxy silyl)ethane, bis(pentenyl diethoxy silyl)propane, bis(pentenyl diethoxy silyl)butane, bis(pentenyl dipropoxy silyl)methane, bis(pentenyl dipropoxy silyl)ethane, bis(pentenyl dipropoxy silyl)propane, bis (pentenyl dipropoxy silyl)butane, bis(pentenyl dibutoxy silyl)methane, bis(pentenyl dibutoxy silyl)ethane, bis(pentenyl dibutoxy silyl)propane, bis(pentenyl dibutoxy silyl)butane, bis(hexenyl dimethoxy silyl)methane, bis(hexenyl dimethoxy silyl)ethane, bis(hexenyl dimethoxy silyl)propane, bis(hexenyl dimethoxy silyl)butane, bis(hexenyl diethoxy silyl)methane, bis(hexenyl diethoxy silyl)ethane, bis(hexenyl diethoxy silyl)propane, bis(hexenyl diethoxy silyl)butane, bis(hexenyl dipropoxy silyl)methane, bis(hexenyl dipropoxy silyl)ethane, bis(hexenyl dipropoxy silyl)propane, bis(hexenyl dipropoxy silyl)butane, bis(hexenyl dibutoxy silyl)methane, bis(hexenyl dibutoxy silyl)ethane, bis (hexenyl dibutoxy silyl)propane, bis(hexenyl dibutoxy silyl) butane, and their derivatives. The substituted alkyl groups in the above derivatives are $C_5$~$C_{12}$ alkyl groups.

Although the temperature for the coupling reaction can be adjusted in a wide range of 40° C.~200° C., the preferred range is 50° C.~120° C. The pure coupling agent or the mixed coupling agent, i.e. coupling agent mixed with the solvent, is usually added into the copolymers in a way of a single batch or a few batches with fixed quantity, and the whole mixture is stirred. The coupling reaction time is usually quite short. The normal coupling reaction time is between about one minute to one hour. However, the longer time is needed, when the reaction proceeds under lower temperature. The coupling agents and the copolymers polymerized by the conjugated diene monomers and the vinyl aromatics monomers are reacted inside the pressure chamber installed with a stirrer and filled with nitrogen gas so as to produce the coupled copolymers.

The manufacturing method for the above coupling copolymers in the present invention can be simplified as the flow chart in FIG. 1. At first, the step 10 of polymerizing the copolymers by the conjugated diene monomers and vinyl aromatics monomers proceeds. Then, the step 12 of adding the silane coupling agent of Formula (I) into the copolymers for the coupling reaction to form coupled copolymers ensues. Since the copolymers formed by the conjugated diene and vinyl aromatics monomers contain unsaturated alkenyl double bonds, so that the performances of the thermal resistance, ultraviolet resistance, anti-oxidation, anti-ozone, weathering resistance are poor. After the coupling reaction is finished, the coupled copolymers can be obtained. However, the alkenyl portions of the coupled copolymers can be optionally hydrogenated, when required. Accordingly, the above issues can be solved, and the above mentioned poor performances can be improved by means of the hydrogenation for the unsaturated double bonds. In order to reach this purpose, the hydrogenation reactions can be done by selecting one of the known hydrogenation techniques or other hydrogenation methods, such as the examples as follows:

(1) The Ziegler-Natta hydrogenation catalyst can be formed by reacting the organic acid salts, acetyl acetonyl salts or alkoxy salts of Co, Ni, Fe and Cr with the organic aluminum reducing agent. Please refer to U.S. Pat. Nos. 3,595,942, 3,634,549, 3,670,054, 3,673,281, 3,696,088, 3,700,633, 3,792,127, 3,823,203, etc. The above catalyst can be used for hydrogenating the copolymers with vinyl aromatics and unsaturated alkenyl double bonds. This kind of catalysts can include VIII group metal compounds, e.g. Ni or Co, combined with the appropriate reducing agents, e.g. lithium, magnesium or aluminum alkyl compounds. In the present invention, the aluminum alkyls are chosen. The reaction conditions of the hydrogenation reaction are listed as follows. The reaction temperature is in a range of 50° C.~150° C., preferably 70° C.~120° C. The reaction pressure is in a range of 10~40 kg/cm$^2$, preferably 15~30 kg/cm$^2$. The reaction is completed in the above mentioned solvents.

(2) The hydrogenation catalysts consisting of the main catalyst of cyclopentadiene metal (III or IV group transition metal) coordination compound and the assistant catalyst of organic lithium, organic magnesium, organic zinc or organic aluminum working as the reducing agent can be used. The suitable reducing agent in the present invention is organic lithium or organic aluminum. The reaction conditions of the hydrogenation reaction are listed as follows. The reaction temperature is in a range of 50° C.~180° C., preferably 70° C.~120° C. The reaction pressure is in a range of 5~40 kg/cm$^2$, preferably 10~30 kg/cm$^2$. The reaction is completed in the above mentioned solvents.

According to the above mentioned methods, the hydrogenation reactions must proceed under the hydrogen gas. The hydrogen gas in gaseous state had better be introduced into the solution of the copolymers.

By means of the above hydrogenation methods, the hydrogenated copolymers with the hydrogenation rate of at least 50%, preferably up to higher than 90%, can be obtained. In the hydrogenation process, the double bonds existing in the original conjugated diene units are dominantly hydrogenated. The hydrogenation rate of the vinyl aromatics is less than 10%. When the copolymers of the vinyl aromatics and the conjugated dienes are hydrogenated, the double bonds in the conjugated diene units are hydrogenated with the hydrogenation rate of at least 50%, preferably higher than 90%.

Figure 2:
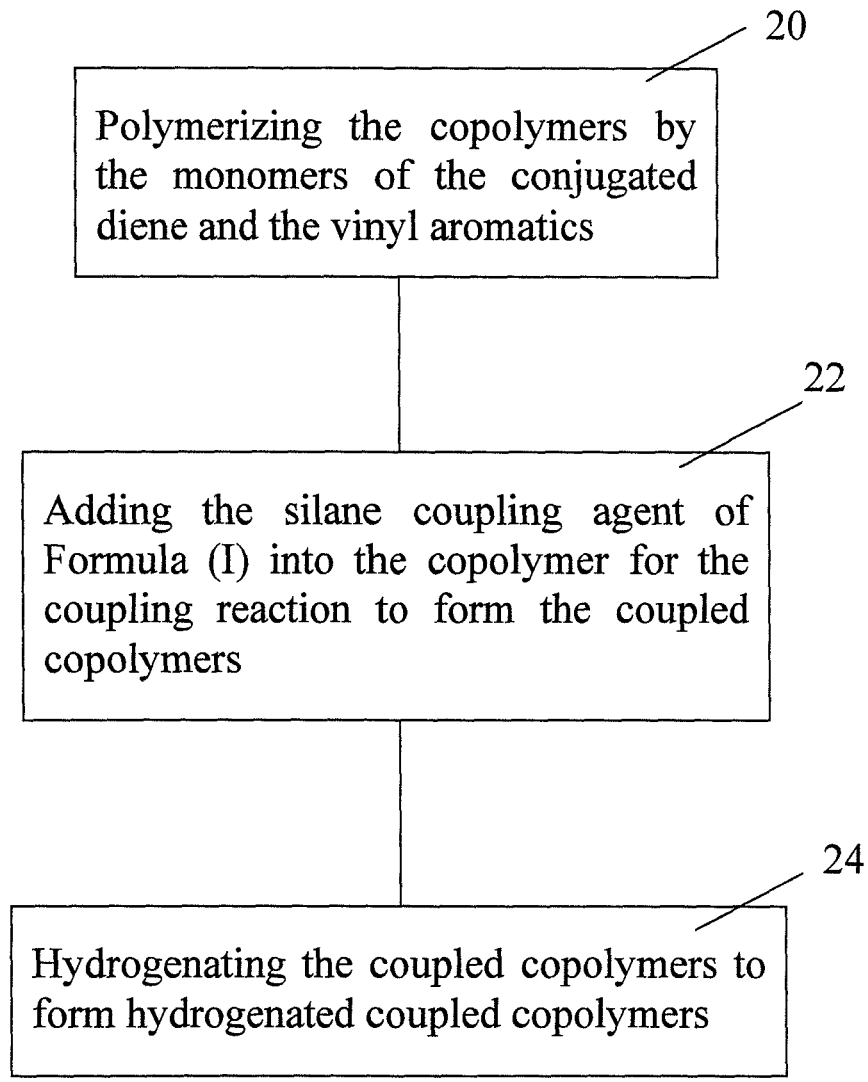
FIG. 2 is the schematic diagram showing the flowchart of the method for manufacturing the hydrogenated coupled copolymers according to one embodiment of the present invention.

The manufacturing method for the hydrogenated coupled copolymers can be simplified as the flow chart in FIG. 2. At first, the step 20 of polymerizing the copolymers by the monomers of the conjugated dienes and the vinyl aromatics proceeds. Then, the step 22 of adding the silane coupling agent of Formula (I) into the copolymer for the coupling reaction to form the coupled copolymers ensues. Finally, the step 24 of hydrogenating the coupled copolymers to form hydrogenated coupled copolymers.

The extraction of the hydrogenated copolymers can be done by the following methods. (1) The method of mixing the solution of the hydrogenated copolymers with the polar solvent can be done. This kind of solvents are poor solvents for the hydrogenated copolymers, e.g. acetone, alcohols, water or other solvents with the same function. This kind of solvents can precipitate the hydrogenated copolymers, so then the hydrogenated copolymers can be obtained. (2) The steam stripping method can be used for the solution of the hydrogenated copolymers to retrieve the solvent and then to obtain the hydrogenated copolymers. (3) The direct heating method can be used to evaporate the solvent and then to obtain the hydrogenated copolymers.

The hydrogenation conversion rate of the above copolymers can be analyzed by using the infrared spectrometer. The analytic method can be referred to U.S. Pat. No. 4,501,857.

In the following, the coupling efficiencies for the hydrogenated coupled copolymers and for the coupled copolymers, which are produced by using the silane coupling agent with the alkenyl and alkoxy groups, are analyzed. The coupling efficiency is defined as the percentage of copolymers being coupled by the coupling agents after the coupling reaction by adding the coupling agents is finished. The coupling efficiency values can be obtained by calculating the data from the gel permeation chromatography (GPC). The integrated areas below the GPC curve of all coupled copolymers (including two-arm, three-arm and four-arm copolymers) are divided by the sum of the integrated areas below the GPC curve of the uncoupled copolymers and all the coupled copolymers to obtain the coupling efficiency values in percentage form. The coupled copolymers in the present invention have the coupling efficiency of 60~95 weight percent, preferably 60~90 weight percent. The hydrogenated coupled copolymers have the coupling efficiency of 60~95 weight percent, preferably 60~90 weight percent. In additions, regarding the content of the multiple-arm product, the four-arm product in the coupled copolymers in the present invention occupies 10~30 weight percent, while the four-arm product in the hydrogenated coupled copolymers in the present invention occupies 10~30 weight percent as well.

The coupled copolymers, the coupling method, the hydrogenated coupled copolymers and the hydrogenation method provided in the present invention are based on the coupling agents with excellent coupling effect for the coupling reaction. These coupling agents not only have high coupling efficiency but also produce no halide to corrode the pipes during the coupling process. The content of the four-arm copolymers after the coupling reaction can reach 10~30 weight percent, and the content of the four-arm copolymers after the hydrogenation reaction can reach 10~30 weight percent. These contents of the four-arm copolymers in the present invention are obviously much higher than 0~5 weight percent for those by using the conventional silane coupling agents. The processed products made of the coupled copolymers with higher content of the four-arm coupled copolymers can perform much more excellent mechanical properties. Thus, the industrial applications for the coupled copolymers in the present invention can be widely promoted. Another advantage is that the coupled copolymers by using the silane coupling agent with the alkenyl and alkoxy groups in the present invention have excellent stability. The coupled copolymers in the present invention after the hydrogenation reaction still can maintain their high coupling efficiency and high content of the four-arm copolymers, and thus can provide excellent rubber mechanical properties.

Several embodiments in the followings are cited to illustrate the methods, features and advantages of the present invention. These embodiments are cited for the illustration and proof, but are not meant to limit the ideas and scopes of the present invention. The scopes of the present invention are defined in the claims.

Embodiment 1-A, B, C, D and E

The styrene of 20 grams is dissolved in the cyclohexane of 1000 grams, then the tetrahydrofuran of 3.6 grams is added, and the n-butyl lithium solution with the fixed amount is added. The polymerization reaction starts at the starting temperature of 50° C. When almost all the styrene monomers are completely reacted to form polymers, the 1,3-butadiene solution of 78 grams is added into this polymer solution, and the temperature is raised to 65~70° C., where the reaction time and the reaction temperature can be appropriately adjusted depending on the design of the reaction tank, the reactants and reaction conditions. When almost all 1,3-butadiene monomers are completely reacted, the first step for preparing the styrene/butadiene block copolymers is finished. After then, the silane coupling agent with the alkenyl and alkoxy groups in the appropriate amount is added into the solution of the above styrene/butadiene block copolymers for the coupling reaction. In this embodiment, the molar ratio of the initiator to the coupling agent is about 3.0~4.5. Furthermore, the coupling agent can be added once for all or in several batches. The number of batches can be 1~4. After the coupling reaction lasts 30 minutes, the method of the stream stripping can be performed to obtain the coupled copolymers. The molecular weight of the copolymer after drying can be known by testing. The experimental results are shown in Table 1. The coupling efficiency of the coupled copolymers can be calculated by using the data from the GPC analysis.

In the embodiment 1-A, the vinyl trimethoxy silane is used as the coupling agent. It can be found from the experimental results in Table 1 that the copolymers coupled by using vinyl trimethoxy silane have the coupling efficiency of 75.2 weight percent, and have the content of four-arm product of 16.6 weight percent.

In the embodiment 1-B, the vinyl triethoxy silane is used as the coupling agent. It can be found from the experimental results in Table 1 that the copolymers coupled by using vinyl triethoxy silane have the coupling efficiency of 73.8 weight percent, and have the content of four-arm product of 21.0 weight percent.

In the embodiment 1-C, the propenyl triethoxy silane is used as the coupling agent. It can be found from the experimental results in Table 1 that the copolymers coupled by using propenyl triethoxy silane have the coupling efficiency of 73.6 weight percent, and have the content of four-arm product of 18.3 weight percent.

In the embodiment 1-D, the butenyl trimethoxy silane is used as the coupling agent. It can be found from the experimental results in Table 1 that the copolymers coupled by using butenyl trimethoxy silane have the coupling efficiency of 77.7 weight percent, and have the content of four-arm product of 29.4 weight percent.

In the embodiment 1-E, the vinyl ethoxy dimethoxy silane is used as the coupling agent. It can be found from the experimental results in Table 1 that the copolymers coupled by using vinyl ethoxy dimethoxy silane have the coupling efficiency of 76.5 weight percent, and have the content of four-arm product of 22.3 weight percent.

TABLE 1

| Emb. 1 | Coupling agents | $M_W$I (x$10^4$) | $M_W$II (x$10^4$) | Molar ratio of Li/Si | Coupling efficiency (wt %) | Four-arm (wt %) | H condition |
|---|---|---|---|---|---|---|---|
| A | Vinyl trimethoxy silane $H_2C$=CH—Si—$(OCH_3)_3$ | 8.3 | 24.5 | 3.3 | 75.2 | 16.6 | Done |
| B | Vinyl triethoxy silane $H_2C$=CH—Si—$(OC_2H_5)_3$ | 7.7 | 24.0 | 3.3 | 73.8 | 21.0 | Done |

TABLE 1-continued

| Emb. 1 | Coupling agents | $M_W$I (x$10^4$) | $M_W$II (x$10^4$) | Molar ratio of Li/Si | Coupling efficiency (wt %) | Four-arm (wt %) | H condition |
|---|---|---|---|---|---|---|---|
| C | Propenyl triethoxy silane $CH_3$—CH=CH—Si—$(OC_2H_5)_3$ | 5.8 | 17.1 | 3.3 | 73.6 | 18.3 | Done |
| D | Butenyl trimethoxy silane $C_2H_5$—CH=CH—Si—$(OCH_3)_3$ | 6.4 | 18.0 | 3.8 | 77.7 | 29.4 | Done |
| E | Vinyl ethoxy dimethoxy silane $CH_2$=CH—Si—$(OCH_3)_2$ \| $(OC_2H_5)$ | 6.7 | 20.3 | 3.3 | 76.5 | 22.3 | Done | where Emb. is the abbreviation of Embodiment, $M_w$ I is the weight average molecular weights of the copolymer before coupling reaction, $M_w$ II is the weight average molecular weights of the copolymer after coupling reaction, the molar ratio of Li/Si is the molar ratio of the n-butyl lithium to the silane coupling agent, four-arm (wt %) is the content of the four-arm product in weight percentage, and H condition is the hydrogenation reaction condition.

Embodiment 2-A

In this embodiment, the Ni/Al hydrogenation catalyst is used for the hydrogenation reaction. The coupled copolymers of 1000 grams in the embodiment 1-A is disposed into the hydrogenation chamber. In this process, the chamber must be isolated from the atmosphere. The temperature is raised to 80° C. The nickel octanoate in 5% concentration and triethyl aluminum in 15% concentration with the molar ratio of 1:2.25 are mixed and pushed into the hydrogenation chamber by the pressure of nitrogen gas in the respective ratios of 0.33 phr and 0.27 phr, totally 0.6 phr, where the phr unit is unit weight of the agent per 100 unit weight of monomers. The pressure of the hydrogen gas is set to 25 kg/cm$^2$, and the hydrogen gas is controlled to slowly flow into the chamber until the pressure of the chamber is equal to the setting pressure. Then the chamber pressure is maintained till the reaction ends. The reaction time is dependent on the hydrogenation reaction result. The hydrogenated copolymer fluid is cooled down to the room temperature. The catalyst is cleaned out, and the hydrogenated copolymers can be obtained by using the standard procedures of the stream stripping method for the hydrogenated polymers. The hydrogenation conditions of the copolymers are analyzed, and the experimental results are shown in Table 2. It can be found from the experimental results that the coupled copolymers from the embodiment 1-A after the hydrogenation reaction under the catalysis of Ni/Al have the ratio of the coupling efficiency after the hydrogenation to that before the hydrogenation higher than 0.7, and have the ratio of the content of four-arm product after the hydrogenation to that before the hydrogenation higher than 0.7 as well.

TABLE 2

| | Before hydrogenation | | After hydrogenation | | H after/ H before | | H rate |
|---|---|---|---|---|---|---|---|
| Emb. 2 | CE (wt %) | 4-arm (wt %) | CE (wt %) | 4-arm (wt %) | CE | 4-arm | (%) |
| A | 75.2 | 16.6 | 73.2 | 18.6 | 0.97 | 1.12 | 96 | where Emb. is the abbreviation of embodiment, CE is the coupling efficiency, the 4-arm (wt %) is the content of four-arm products in weight percentage, the H after/H before is the ratio of the data after the hydrogenation to that before the hydrogenation, and H rate is the hydrogenation rate.

Embodiment 3-A

In this embodiment, the cyclopentadiene metal (Ti/Al) coordination compound is used as the hydrogenation catalyst for the hydrogenation reaction. The coupled copolymers of 1000 grams in the embodiment 1-A is disposed into the hydrogenation chamber. In this process, the chamber must be isolated from the atmosphere. The temperature is raised to 78° C. The dicyclopentadienyl titanium dichloride and triethyl aluminum in the concentration of 100 ppm and with the molar ratio of 1:2 are added. The hydrogen gas is introduced, and the pressure of the hydrogen gas is set to 25 kg/cm$^2$. After the hydrogenation reaction time reaches 60 minutes, the catalyst is cleaned out, and the hydrogenated copolymers can be obtained by using the standard procedures of the stream stripping method for the hydrogenated polymers. The samples are taken for the analysis of the infrared spectrometer to find out the hydrogenation rates. The experimental results are shown in Table 3. It can be found from the experimental results that the coupled copolymers from the embodiment 1-A after the hydrogenation reaction under the catalysis of Ti/Al have the ratio of the coupling efficiency after the hydrogenation to that before the hydrogenation higher than 0.7, and have the ratio of the content of four-arm product after the hydrogenation to that before the hydrogenation higher than 0.7 as well. These results show that the coupling efficiency and the content of four-arm product are still maintained after the hydrogenation reaction.

TABLE 3

| | Before hydrogenation | | After hydrogenation | | H after/ H before | | H rate |
|---|---|---|---|---|---|---|---|
| Emb. 3 | CE (wt %) | 4-arm (wt %) | CE (wt %) | 4-arm (wt %) | CE | 4-arm | (%) |
| A | 75.2 | 16.6 | 78.8 | 18.0 | 1.05 | 1.08 | 97 | where Emb. is the abbreviation of embodiment, CE is the coupling efficiency, the 4-arm (wt %) is the content of four-arm products in weight percentage, the H after/H before is the ratio of the data after the hydrogenation to that before the hydrogenation, and H rate is the hydrogenation rate.

Comparison Embodiment (I)

The styrene of 20 grams is dissolved in the cyclohexane of 1000 grams, then the tetrahydrofuran of 3.6 grams is added, and the n-butyl lithium solution with the fixed amount is added. The polymerization reaction starts at the starting temperature of 50° C. When almost all the styrene monomers are completely reacted to form polymers, the 1,3-butadiene solution of 78 grams is added into this polymer solution, and the temperature is raised to 65~70° C., where the reaction time and the reaction temperature can be appropriately adjusted depending on the design of the reaction tank, the reactants and reaction conditions. When almost all 1,3-butadiene monomers are completely reacted, the first step for preparing the styrene/butadiene block copolymers is finished. After then, the block copolymers are reacted with various coupling agents for the coupling reaction. The following steps can be referred to the embodiment 1. Then the stream stripping can be performed to obtain the coupled copolymers. The molecular weight of the copolymer after drying can be known by testing. The coupling efficiency of the coupled copolymers can be calculated by using the data from the GPC analysis. The steps for the hydrogenation reaction in the embodiments 2~3 are performed. The experimental results by using various coupling agents are shown in Table 4.

It can be found from the experimental results in Table 4 that the copolymers coupled by using the coupling agent, triacetoxy methyl silane, have the coupling efficiency of only 53.0 weight percent, and have the content of four-arm product of only 6.5 weight percent, and the hydrogenation reaction did not work by using the Ti/Al catalyst in the embodiment 2-A.

Comparison Embodiment (II)

The experimental steps in the comparison embodiment (I) are repeated to prepare the coupled copolymers. In this comparison embodiment, the methyl methoxy silane is used as the coupling agent. It can be found from the experimental results in Table 4 that in this comparison embodiment, the copolymers coupled by using the coupling agent, methyl methoxy silane, have the coupling efficiency of 64.9 weight percent, and have the content of four-arm products of only 1.7 weight percent. Both the coupling efficiency and the content of the four-arm products are not good.

Comparison Embodiment (III)

The experimental steps in the comparison embodiment (I) are repeated to prepare the coupled copolymers. In this comparison embodiment, the hexaethoxy disilane is used as the coupling agent. It can be found from the experimental results in Table 4 that in this comparison embodiment, the copolymers coupled by using the coupling agent, hexaethoxy disilane, have the coupling efficiency of 80.1 weight percent, and have the content of four-arm products of only 4.0 weight percent. The coupling efficiency is not bad, but the content of the four-arm products are poor. Thus, the overall performances are inferior to those by using the coupling agents disclosed in the present invention. It can be known from the above that even the coupling agent has two coupling centers, and contains six coupling sites, but are still unable to promote the coupling efficiency and the content of the four-arm products.

Comparison Embodiment (IV)

The experimental steps in the comparison embodiment (I) are repeated to prepare the coupled copolymers. In this comparison embodiment, the tetramethoxy silane is used as the coupling agent. It can be found from the experimental results in Table 4 that in this comparison embodiment, the copolymers coupled by using the coupling agent, tetramethoxy silane, have the coupling efficiency of 75.3 weight percent, and have the content of four-arm products of only 5.3 weight percent. In the same coupling conditions, the copolymers coupled by using the coupling agent, tetramethoxy silane, can not have the high content of four-arm products as the coupled copolymers have by using the silane coupling agent with the alkene and the alkoxy groups in the present invention.

TABLE 4

| Com. Emb. | Coupling agents | $M_W$I (x10$^4$) | $M_W$II (x10$^4$) | Molar ratio of Li/Si | C. E. (wt %) | Four-arm (wt %) | H condition |
|---|---|---|---|---|---|---|---|
| 1 | Triacetoxy methyl silane 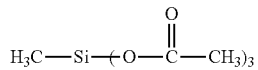 | 8.3 | 18.1 | 3.3 | 53.0 | 6.5 | No H |
| 2 | Methyl Methoxy silane 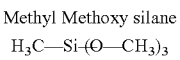 | 7.6 | 20.3 | 3.3 | 64.9 | 1.7 | Done |

TABLE 4-continued

| Com. Emb. | Coupling agents | $M_W$I ($\times 10^4$) | $M_W$II ($\times 10^4$) | Molar ratio of Li/Si | C. E. (wt %) | Four-arm (wt %) | H condition |
|---|---|---|---|---|---|---|---|
| 3 | Hexaethoxy disilane $(H_3CO)_3$—Si—$C_6H_{12}$—Si—$(OCH_3)_3$ | 7.3 | 15.4 | 3.3 | 80.1 | 4.0 | Done |
| 4 | Tetramethoxy silane Si—(O—$CH_3)_4$ | 6.9 | 19.4 | 3.3 | 75.3 | 5.3 | Done | where Com. Emb. is the abbreviation of comparison embodiment, $M_w$I is the weight average molecular weights of the copolymers before coupling reaction, $M_w$II is the weight average molecular weights of the copolymers after coupling reaction, the molar ratio of Li/Si is the molar ratio of n-butyl lithium to coupling agent, the C. E. is the coupling efficiency, the four-arm (wt %) is the content of the four-arm products in weight percent, H condition is the hydrogenation reaction condition, and the No H means no hydrogenation.

Embodiment (IV) and Comparison Embodiment (V)

The Table 5 is the experimental results of the mechanical properties of the hydrogenated coupled copolymers made by using the silane coupling agent with vinyl triethoxy groups in the present invention and the hydrogenated coupled copolymers by using the conventional coupling agent, tetramethoxy silane. The tensile strengths, elongations and modulus of the above coupled copolymers without adding oil and the above coupled copolymers by adding the oil with the same weight as that of each of the copolymers are shown in Table 5, where the oil is Star-4 extension oil produced by the US Shell Petroleum Company. Compared with the copolymers coupled by using the conventional coupling agent, tetramethoxy silane, the copolymers coupled by using the silane coupling agent with the vinyl triethoxy groups disclosed in the present invention have higher modulus no matter the oil is added or not, and are harder overall during the stretching.

TABLE 5

| | Coupling agent | Oil | Tensile strength (kg/cm²) | Elongation (%) | Modulus (kg/cm²) | | |
|---|---|---|---|---|---|---|---|
| | | | | | $M_{100}$ | $M_{200}$ | $M_{300}$ |
| Emb. 4 | Vinyl triethoxy silane | No | 278 | 492 | 24.3 | 33.8 | 55.7 |
| | | Added | 36 | 534 | 8.4 | 11.2 | 15.0 |
| Com. Emb. 5 | Tetramethoxy silane | No | 255 | 512 | 22.9 | 29.7 | 46.1 |
| | | Added | 73 | 722 | 6.4 | 8.4 | 11.2 |

Figure 3:
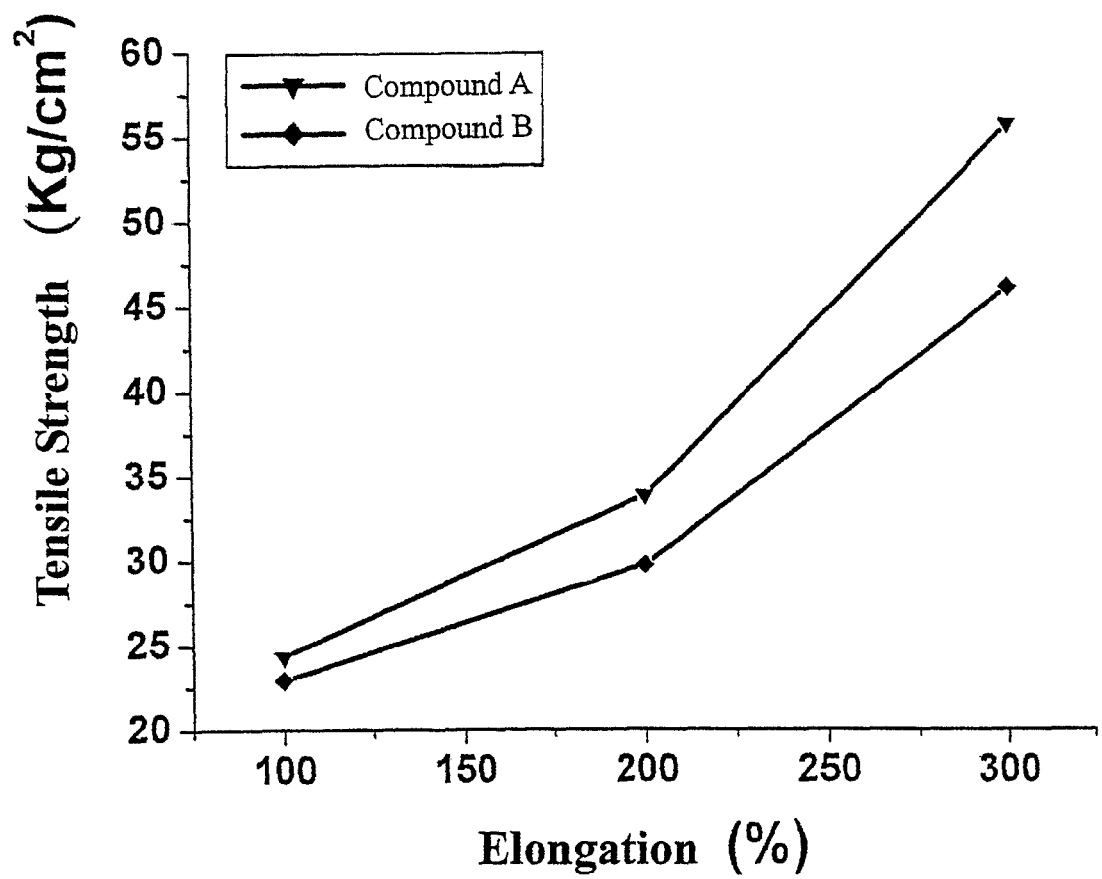
FIG. 3 is the schematic diagram showing the relationship of the tensile strength vs. elongation for the compound A by using the coupling agent of the present invention and the compound B by using the conventional coupling agent under the condition of no adding oil.
Figure 4:
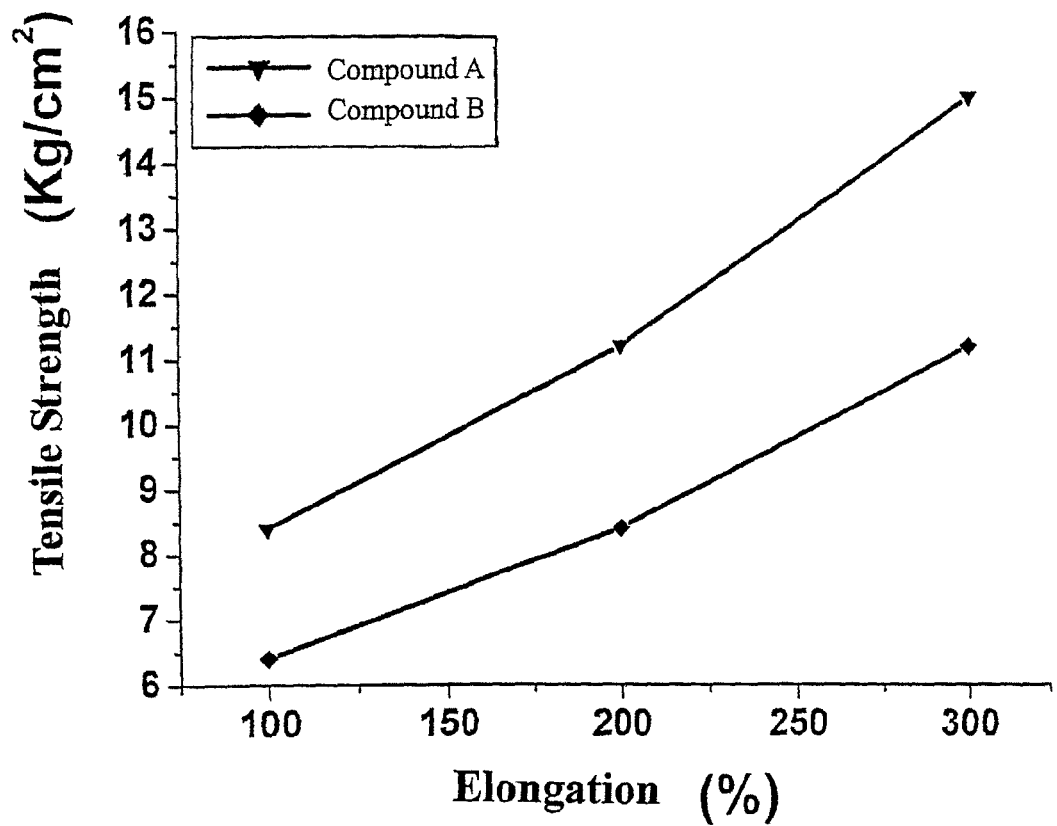
FIG. 4 is the schematic diagram showing the relationship of the tensile strength vs. elongation for the compound A by using the coupling agent of the present invention and the compound B by using the conventional coupling agent under the condition of adding oil with the equivalent weight of the copolymers.

The modulus values of the copolymers by adding oil with the same weight as that of each of the copolymers and the modulus values of the copolymers without adding oil in Table 5 are shown in FIGS. 3 and 4, respectively, where the coupling agent, vinyl triethoxy silane, in the embodiment 4 of the present invention is annotated as the coupling agent A; while the conventional coupling agent, tetramethoxy silane, in the comparison embodiment 5 is annotated as the coupling agent B. It can be seen from FIGS. 3 and 4 that the hydrogenated coupled copolymers made by using the coupling agent of the present invention have much higher modulus than those made by the conventional coupling agent.

To sum up, the following results can be concluded from the experiments of the present invention. The coupled copolymers of the embodiments 1A~E are made by using the silane coupling agents with the alkenyl and alkoxy groups disclosed in the present invention, have the coupling efficiencies of 75.2, 73.8, 73.6, 77.7 and 76.5 in weight percentages, respectively, and the content of four-arm products of 16.6, 21.0, 18.3, 29.4 and 22.3 in weight percentages, respectively. In contrast, the coupled copolymer made by using the conventional coupling agents in the comparison embodiments 1~4 have the coupling efficiencies of 53.0, 64.9, 80.1 and 75.3 in weight percentages, respectively, and have the content of the four-arm products of 6.5, 1.7, 4.0 and 5.3 in weight percentages, respectively. The experimental results prove that the copolymers made by using the silane coupling agents with the alkenyl and alkoxy groups disclosed in the present invention have higher coupling efficiencies and higher content of four-arm products than those made by using the conventional coupling agents. Besides, the copolymers made by using the silane coupling agents with the alkenyl and alkoxy groups after the hydrogenation still maintain the high coupling efficiencies and high content of four-arm products no matter Ni/Al or Ti/Al hydrogenation catalyst is used. With regard to the testing of the mechanical properties, the coupled copolymers made by using the coupling agent, vinyl triethoxy silane, have higher tensile strength and higher modulus than those made by using the tetramethoxy silane. The experimental results prove that the copolymers made by using vinyl triethoxy silane, perform better mechanical properties than those made by using the tetramethoxy silane, and thus can provide excellent rubber mechanical properties.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A coupled copolymer coupled by reacting a silane coupling agent with a copolymer, wherein the copolymer is polymerized by a conjugated diene monomer and a vinyl aromatics monomer, and the silane coupling agent has an alkenyl group and a alkoxy group, and has a chemical Formula (I) as follows:

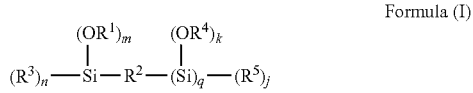

Formula (I)

wherein:
- $R^1$ and $R^4$ are alkyl groups;
- $R^3$ is a group having an alkenyl group;
- $R^5$ is one selected from a group consisting of an alkoxy, an alkyl and an alkenyl groups;
- q is one of "1" and "0";
- when q=0, then k=j=0, $1 \leq n \leq 3$, $0 \leq m \leq 2$, m+n=3, and $R^2$ is an alkoxy group;
- when q=1, then k+j=3, $R^2$ is —$(CH_2)_r$—, r=1-6 and m+n=3; and
- the coupled copolymer comprises a four-arm coupled copolymer in a range of 10-30 weight percent of the coupled copolymer.

2. A coupled copolymer according to claim 1, wherein the vinyl aromatics comprises one selected from a group consisting of styrene, α-methyl styrene, p-ethyl styrene, cyclohexyl styrene, p-methyl styrene, o-methyl styrene, m-methyl styrene, 1-vinyl-5-hexyl naphthalene, vinyl naphthalene, and a combination thereof.

3. A coupled copolymer according to claim 1, wherein the conjugated diene comprises one selected from a group consisting of 1,3-butadiene, 2,3-dimethyl-1,3-butadiene, 3-butyl-1,3-octadiene, isoprene, 1,3-piperlene, 2-phenyl-1,3-butadiene and a combination thereof.

4. A coupled copolymer according to claim 1, having a number average molecular weight in a range of 30,000 to 600,000.

5. A coupled copolymer according to claim 1, having a coupling efficiency in a range of 60-95 weight percent.

6. A coupled copolymer according to claim 1, wherein a molar ratio of the coupled copolymer to the silane coupling agent is in a range of 1.4-6.67.

7. A coupled copolymer according to claim 1, wherein the silane coupling agent comprises one selected from a group consisting of vinyl trimethoxy silane, vinyl triethoxy silane, vinyl tripropoxy silane, vinyl tributoxy silane, vinyl ethoxy dimethoxy silane, vinyl ethoxy dipropoxy silane, vinyl ethoxy dibutoxy silane, vinyl diethoxy methoxy silane, vinyl diethoxy propoxy silane, vinyl diethoxy butoxy silane, propenyl trimethoxy silane, propenyl triethoxy silane, propenyl tripropoxy silane, propenyl tributoxy silane, propenyl ethoxy dimethoxy silane, propenyl ethoxy dipropoxy silane, propenyl ethoxy dibutoxy silane, propenyl diethoxy methoxy silane, propenyl diethoxy propoxy silane, propenyl diethoxy butoxy silane, butenyl trimethoxy silane, butenyl triethoxy silane, butenyl tripropoxy silane, butenyl tributoxy silane, butenyl ethoxy dimethoxy silane, butenyl ethoxy dipropoxy silane, butenyl ethoxy dibutoxy silane, butenyl diethoxy methoxy silane, butenyl diethoxy propoxy silane, butenyl diethoxy butoxy silane, pentenyl trimethoxy silane, pentenyl triethoxy silane, pentenyl tripropoxy silane, pentenyl tributoxy silane, pentenyl ethoxy dimethoxy silane, pentenyl ethoxy dipropoxy silane, pentenyl ethoxy dibutoxy silane, pentenyl diethoxy methoxy silane, pentenyl diethoxy propoxy silane, pentenyl diethoxy butoxy silane, hexenyl trimethoxy silane, hexenyl triethoxy silane, hexenyl tripropoxy silane, hexenyl tributoxy silane, hexenyl ethoxy dimethoxy silane, hexenyl ethoxy dipropoxy silane, hexenyl ethoxy dibutoxy silane, hexenyl dimethoxy methoxy silane, hexenyl dimethoxy propoxy silane, hexenyl dimethoxy butoxy silane, bis(vinyl dimethoxy silyl)methane, bis(vinyl dimethoxy silyl)ethane, bis(vinyl dimethoxy silyl)propane, bis(vinyl dimethoxy silyl)butane, bis(vinyl diethoxy silyl)methane, bis(vinyl diethoxy silyl)ethane, bis(vinyl diethoxy silyl)propane, bis(vinyl diethoxy silyl)butane, bis(vinyl dipropoxy silyl)methane, bis(vinyl dipropoxy silyl)ethane, bis(vinyl dipropoxy silyl)propane, bis(vinyl dipropoxy silyl)butane, bis(vinyl dibutoxy silyl)methane, bis(vinyl dibutoxy silyl)ethane, bis(vinyl dibutoxy silyl)propane, bis(vinyl dibutoxy silyl)butane, bis(propenyl dimethoxy silyl)methane, bis(propenyl dimethoxy silyl)ethane, bis(propenyl dimethoxy silyl)propane, bis(propenyl dimethoxy silyl)butane, bis(propenyl diethoxy silyl)methane, bis(propenyl diethoxy silyl)ethane, bis(propenyl diethoxy silyl)propane, bis(propenyl diethoxy silyl)butane, bis(propenyl dipropoxy silyl)methane, bis(propenyl dipropoxy silyl)ethane, bis(propenyl dipropoxy silyl)propane, bis(propenyl dipropoxy silyl)butane, bis(propenyl dibutoxy silyl)methane, bis(propenyl dibutoxy silyl)ethane, bis(propenyl dibutoxy silyl)propane, bis(propenyl dibutoxy silyl)butane, bis(butenyl dimethoxy silyl)methane, bis(butenyl dimethoxy silyl)ethane, bis(butenyl dimethoxy silyl)propane, bis(butenyl dimethoxy silyl)butane, bis(butenyl diethoxy silyl)methane, bis(butenyl diethoxy silyl)ethane, bis(butenyl diethoxy silyl)propane, bis(butenyl diethoxy silyl)butane, bis(butenyl dipropoxy silyl)methane, bis(butenyl dipropoxy silyl)ethane, bis(butenyl dipropoxy silyl)propane, bis(butenyl dipropoxy silyl)butane, bis(butenyl dibutoxy silyl)methane, bis(butenyl dibutoxy silyl)ethane, bis(butenyl dibutoxy silyl)propane, bis(butenyl dibutoxy silyl)butane, bis(pentenyl dimethoxy silyl)methane, bis(pentenyl dimethoxy silyl)ethane, bis(pentenyl dimethoxy silyl)propane, bis(pentenyl dimethoxy silyl)butane, bis(pentenyl diethoxy silyl)methane, bis(pentenyl diethoxy silyl)ethane, bis(pentenyl diethoxy silyl)propane, bis(pentenyl diethoxy silyl)butane, bis(pentenyl dipropoxy silyl)methane, bis(pentenyl dipropoxy silyl)ethane, bis(pentenyl dipropoxy silyl)propane, bis(pentenyl dipropoxy silyl)butane, bis(pentenyl dibutoxy silyl)methane, bis(pentenyl dibutoxy silyl)ethane, bis(pentenyl dibutoxy silyl)propane, bis(pentenyl dibutoxy silyl)butane, bis(hexenyl dimethoxy silyl)methane, bis(hexenyl dimethoxy silyl)ethane, bis(hexenyl dimethoxy silyl)propane, bis(hexenyl dimethoxy silyl)butane, bis(hexenyl diethoxy silyl)methane, bis(hexenyl diethoxy silyl)ethane, bis(hexenyl diethoxy silyl)propane, bis(hexenyl diethoxy silyl)butane, bis(hexenyl dipropoxy silyl)methane, bis(hexenyl dipropoxy silyl)ethane, bis(hexenyl dipropoxy silyl)propane, bis(hexenyl dipropoxy silyl)butane, bis(hexenyl dibutoxy silyl)methane, bis(hexenyl dibutoxy silyl)ethane, bis(hexenyl dibutoxy silyl)propane, bis(hexenyl dibutoxy silyl)butane and a derivative thereof.

8. A method for manufacturing a coupled copolymer, comprising:
(a) polymerizing a copolymer by using a conjugated diene monomer and a vinyl aromatics monomer; and
(b) mixing a silane coupling agent, which has an alkenyl group and an alkoxy group, with the copolymer for undergoing a coupling reaction to form a coupled copolymer, wherein the silane coupling agent has a chemical Formula (I) as follows:

$$\begin{array}{c}(OR^1)_m \quad (OR^4)_k \\ | \quad\quad | \\ (R^3)_n\text{——}Si\text{——}R^2\text{——}(Si)_q\text{——}(R^5)_j\end{array} \quad \text{Formula (I)}$$

wherein:
R$^1$ and R$^4$ are alkyl groups;
R$^3$ is a group having an alkenyl group;
R$^5$ is one selected from a group consisting of an alkoxy, an alkyl and an alkenyl groups;
q is one of "1" and "0";
when q=0, then k=j=0, 1≦n≦3, 0≦m≦2, m+n=3, and R$^2$ is an alkoxy group;
when q=1, then k+j=3, R$^2$ is —(CH$_2$)$_r$, r=1-6 and m+n=3; and
the coupled copolymer comprises a four-arm coupled copolymer in a range of 10-30 weight percent of the coupled copolymer.

9. A method according to claim 8, wherein the coupled copolymer has a coupling efficiency in a range of 60-95 weight percent.

10. A hydrogenated coupled copolymer formed by reacting a copolymer, which is polymerized by using a conjugated diene monomer and a vinyl aromatics monomer, with a silane coupling agent having an alkenyl group and an alkoxy group to form a coupled copolymer, and treating the coupled copolymer with a hydrogenation reaction, wherein the silane coupling agent has a chemical Formula (I) as follows:

$$\begin{array}{c}(OR^1)_m \quad (OR^4)_k \\ | \quad\quad | \\ (R^3)_n\text{——}Si\text{——}R^2\text{——}(Si)_q\text{——}(R^5)_j\end{array} \quad \text{Formula (I)}$$

wherein:
R$^1$ and R$^4$ are alkyl groups;
R$^3$ is a group having an alkenyl group;
R$^5$ is one selected from a group consisting of an alkoxy, an alkyl and an alkenyl groups;
q is one of "1" and "0";
when q=0, then k=j=0, 1≦n≦3, 0≦m≦2, m+n=3, and R$^2$ is alkoxy group;
when q=1, then k+j=3, R$^2$ is —(CH$_2$)$_r$, r=1-6 and m+n=3; and
the coupled copolymer comprises a four-arm coupled copolymer in a range of 10-30 weight percent of the coupled copolymer.

11. A hydrogenated coupled copolymer according to claim 10, wherein the vinyl aromatics comprises one selected from a group consisting of styrene, α-methyl styrene, p-ethyl styrene, cyclohexyl styrene, p-methyl styrene, o-methyl styrene, m-methyl styrene, 1-vinyl-5-hexyl naphthalene, vinyl naphthalene, and a combination thereof.

12. A hydrogenated coupled copolymer according to claim 10, wherein the conjugated diene comprises one selected from a group consisting of 1,3-butadiene, 2,3-dimethyl-1,3-butadiene, 3-butyl-1,3-octadiene, isoprene, 1,3-piperlene, 2-phenyl-1,3-butadiene and a combination thereof.

13. A hydrogenated coupled copolymer according to claim 10, having a number average molecular weight in a range of 30,000 to 600,000.

14. A hydrogenated coupled copolymer according to claim 10, having a coupling efficiency in a range of 60-95 weight percent.

15. A hydrogenated coupled copolymer according to claim 10, wherein a molar ratio of the coupled copolymer to the silane coupling agent is in a range of 1.4-6.67.

16. A hydrogenated coupled copolymer according to claim 10, wherein the silane coupling agent comprises one selected from a group consisting of vinyl trimethoxy silane, vinyl triethoxy silane, vinyl tripropoxy silane, vinyl tributoxy silane, vinyl ethoxy dimethoxy silane, vinyl ethoxy dipropoxy silane, vinyl ethoxy dibutoxy silane, vinyl diethoxy methoxy silane, vinyl diethoxy propoxy silane, vinyl diethoxy butoxy silane, propenyl trimethoxy silane, propenyl triethoxy silane, propenyl tripropoxy silane, propenyl tributoxy silane, propenyl ethoxy dimethoxy silane, propenyl ethoxy dipropoxy silane, propenyl ethoxy dibutoxy silane, propenyl diethoxy methoxy silane, propenyl diethoxy propoxy silane, propenyl diethoxy butoxy silane, butenyl trimethoxy silane, butenyl triethoxy silane, butenyl tripropoxy silane, butenyl tributoxy silane, butenyl ethoxy dimethoxy silane, butenyl ethoxy dipropoxy silane, butenyl ethoxy dibutoxy silane, butenyl diethoxy methoxy silane, butenyl diethoxy propoxy silane, butenyl diethoxy butoxy silane, pentenyl trimethoxy silane, pentenyl triethoxy silane, pentenyl tripropoxy silane, pentenyl tributoxy silane, pentenyl ethoxy dimethoxy silane, pentenyl ethoxy dipropoxy silane, pentenyl ethoxy dibutoxy silane, pentenyl diethoxy methoxy silane, pentenyl diethoxy propoxy silane, pentenyl diethoxy butoxy silane, hexenyl trimethoxy silane, hexenyl triethoxy silane, hexenyl tripropoxy silane, hexenyl tributoxy silane, hexenyl ethoxy dimethoxy silane, hexenyl ethoxy dipropoxy silane, hexenyl ethoxy dibutoxy silane, hexenyl dimethoxy methoxy silane, hexenyl dimethoxy propoxy silane, hexenyl dimethoxy butoxy silane, bis(vinyl dimethoxy silyl)methane, bis(vinyl dimethoxy silyl)ethane, bis(vinyl dimethoxy silyl)propane, bis(vinyl dimethoxy silyl)butane, bis(vinyl diethoxy silyl)methane, bis(vinyl diethoxy silyl)ethane, bis(vinyl diethoxy silyl)propane, bis(vinyl diethoxy silyl)butane, bis(vinyl dipropoxy silyl)methane, bis(vinyl dipropoxy silyl)ethane, bis(vinyl dipropoxy silyl)propane, bis(vinyl dipropoxy silyl)butane, bis(vinyl dibutoxy silyl)methane, bis(vinyl dibutoxy silyl)ethane, bis(vinyl dibutoxy silyl)propane, bis(vinyl dibutoxy silyl)butane, bis(propenyl dimethoxy silyl)methane, bis(propenyl dimethoxy silyl)ethane, bis(propenyl dimethoxy silyl)propane, bis(propenyl dimethoxy silyl)butane, bis(propenyl diethoxy silyl)methane, bis(propenyl diethoxy silyl)ethane, bis(propenyl diethoxy silyl)propane, bis(propenyl diethoxy silyl)butane, bis(propenyl dipropoxy silyl)methane, bis(propenyl dipropoxy silyl)ethane, bis(propenyl dipropoxy silyl)propane, bis(propenyl dipropoxy silyl)butane, bis(propenyl dibutoxy silyl)methane, bis(propenyl dibutoxy silyl)ethane, bis(propenyl dibutoxy silyl)propane, bis(propenyl dibutoxy silyl)butane, bis(butenyl dimethoxy silyl)methane, bis(butenyl dimethoxy silyl)ethane, bis(butenyl dimethoxy silyl)propane, bis(butenyl dimethoxy silyl)butane, bis(butenyl diethoxy silyl)methane, bis(butenyl diethoxy silyl)ethane, bis(butenyl diethoxy silyl)propane, bis(butenyl diethoxy silyl)butane, bis(butenyl dipropoxy silyl)methane, bis(butenyl dipropoxy silyl)ethane, bis(butenyl dipropoxy silyl)propane, bis(butenyl dipropoxy silyl)butane, bis(butenyl dibutoxy silyl)methane, bis(butenyl dibutoxy silyl)ethane, bis(butenyl dibutoxy silyl)propane, bis(butenyl dibutoxy silyl)butane, bis(pentenyl dimethoxy silyl)methane, bis(pentenyl dimethoxy silyl)ethane, bis(pentenyl dimethoxy silyl)propane, bis(pentenyl dimethoxy silyl)butane, bis(pentenyl diethoxy silyl)methane, bis(pentenyl diethoxy silyl)ethane, bis(pentenyl diethoxy silyl)propane, bis(pentenyl diethoxy silyl)butane, bis(pentenyl dipropoxy silyl)methane, bis(pentenyl dipropoxy silyl)ethane, bis(pentenyl dipropoxy silyl)propane, bis(pentenyl dipropoxy silyl)butane, bis(pentenyl dibutoxy silyl)methane, bis(pentenyl dibutoxy silyl)ethane, bis(pentenyl dibutoxy silyl)propane, bis(pentenyl dibutoxy silyl)butane, bis(hexenyl dimethoxy silyl)methane, bis(hexenyl dimethoxy silyl)ethane, bis(hexenyl dimethoxy silyl)propane, bis(hexenyl dimethoxy silyl)butane, bis(hexenyl diethoxy silyl)methane, bis(hexenyl diethoxy silyl)ethane, bis(hexenyl diethoxy silyl)propane, bis(hexenyl diethoxy silyl)butane, bis(hexenyl dipropoxy silyl)methane, bis(hexenyl dipropoxy silyl)ethane, bis(hexenyl dipropoxy silyl)propane, bis(hexenyl dipropoxy silyl)butane, bis(hexenyl dibutoxy silyl)methane, bis(hexenyl dibutoxy silyl)ethane, bis(hexenyl dibutoxy silyl)propane, bis(hexenyl dibutoxy silyl)butane and a derivative thereof.

17. A hydrogenated coupled copolymer according to claim 10, comprising a first part and a second part, wherein the first part is formed from the conjugated diene monomer and has a hydrogenation rate higher than 50%, and the second part is formed from the vinyl aromatics monomer and has a hydrogenation rate lower than 10%.

18. A hydrogenated coupled copolymer according to claim 17, wherein the hydrogenation rate of the first part is higher than 90%.

* * * * *